(12) United States Patent
Nade (10) Patent No.: US 10,241,600 B2
(45) Date of Patent: Mar. 26, 2019

(54) MOBILE TERMINAL

(71) Applicant: KYOCERA CORPORATION, Kyoto (JP)

(72) Inventor: Toshiaki Nade, Kaizuka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/359,489

(22) Filed: Nov. 22, 2016

(65) Prior Publication Data
US 2017/0075444 A1 Mar. 16, 2017

Related U.S. Application Data

(63) Continuation of application No. PCT/JP2015/065263, filed on May 27, 2015.

(30) Foreign Application Priority Data

May 28, 2014 (JP) ................. 2014-110125

(51) Int. Cl.
*G06F 3/041* (2006.01)
*G09F 9/00* (2006.01)
*H04M 1/02* (2006.01)

(52) U.S. Cl.
CPC ............ *G06F 3/041* (2013.01); *G09F 9/00* (2013.01); *H04M 1/0202* (2013.01); *H04M 1/026* (2013.01); *H04M 1/0268* (2013.01); *G06F 2203/04102* (2013.01); *H04M 2250/22* (2013.01)

(58) Field of Classification Search
CPC .......... G06F 3/041; G06F 2203/04102; H04M 1/026; H04M 1/0268; H04M 1/0202; H04M 2250/22
See application file for complete search history.

(56) References Cited

U.S. PATENT DOCUMENTS

| 2007/0229475 A1* | 10/2007 | Gettemy | ............... G06F 1/1626 |
| | | | 345/173 |
| 2013/0002133 A1 | 1/2013 | Jin et al. | |
| 2014/0132488 A1 | 5/2014 | Kim et al. | |
| 2014/0247405 A1 | 9/2014 | Jin et al. | |
| 2015/0234512 A1* | 8/2015 | Kang | .................... G06F 3/0412 |
| | | | 345/173 |

FOREIGN PATENT DOCUMENTS

| JP | 2008-306244 A | 12/2008 |
| JP | 2013-003915 A | 1/2013 |
| JP | 2013-015835 A | 1/2013 |
| WO | WO 2013/048925 A2 | 4/2013 |

OTHER PUBLICATIONS

International Search Report in International Application No. PCT/JP2015/065263, dated Aug. 18, 2015, in 2 pages.
Written Opinion of the International Searching Authority in International Application No. PCT/JP2015/065263, dated Aug. 18, 2015, and Concise Explanation Thereof, in 5 pages.

* cited by examiner

*Primary Examiner* — Liliana Cerullo
(74) *Attorney, Agent, or Firm* — Duane Morris LLP (57) ABSTRACT

A mobile phone as a mobile terminal includes a flexible display, a cover glass as a cover configured to protect the flexible display, a touch panel which is integral with the cover, a substrate located behind the flexible display, and an adhesive layer configured to partly bond the flexible display and the touch panel in correspondence to a position where the substrate is located.

5 Claims, 9 Drawing Sheets

| CURVED PORTION | PLANAR PORTION | CURVED PORTION |

MOBILE TERMINAL

CROSS-REFERENCE TO RELATED APPLICATION

The present application is a continuation based on PCT Application No. PCT/JP2015/065263 filed on May 27, 2015, which claims the benefit of Japanese Application No. 2014-110125, filed on May 28, 2014. PCT Application No. PCT/JP2015/065263 is entitled "Mobile Terminal Device", and Japanese Application No. 2014-110125 is entitled "Mobile Terminal." The content of which are incorporated by reference herein in their entirety.

FIELD

Embodiments of the present disclosure relate to a mobile terminal, and more particularly to a mobile terminal including a flexible display.

BACKGROUND

In a certain type of mobile terminal device, for example, since a flexible display, a flexible substrate and a housing are bent, one can bend the whole mobile terminal device.

SUMMARY

The reference characters, supplementary explanation and the like in parentheses indicate correspondence with embodiments to be described in order to help understanding of the present disclosure, and do not limit the present disclosure at all.

A first aspect is a mobile terminal including a flexible display, a cover configured to protect the flexible display, a touch panel which is integral with the cover, a substrate located behind the flexible display, and an adhesive layer configured to partly bond the flexible display and the touch panel in correspondence to a position where the substrate is located.

In the first aspect, in a mobile terminal (10: reference character illustrating a corresponding component in an embodiment; the same shall apply hereinafter), the flexible display (16) which is an organic electroluminescence display, for example, is protected by the cover (14). By depositing a transparent electrode functioning as the touch panel (18) on the cover, the touch panel is integral with the cover. The substrate (30) with a processor and the like mounted thereon, for example, is located behind the flexible display. The adhesive layer (40) is an adhesive agent, for example, and partly bonds the flexible display and the touch panel in correspondence to a position at which the substrate is located.

According to the first aspect, by partly bonding the touch panel which is integral with the cover and the flexible display, the flexible display can be unlikely to be damaged because when the flexible display is deformed in accordance with a deformation of the cover, even if a load resulting from the deformation is applied to the flexible display, the load on the flexible display is relieved through the unhanded portion.

A second aspect depends on the first aspect, and the cover includes a planar portion and a curved portion configured to be deformed, the substrate is located behind the flexible display at a position corresponding to the planar portion, the adhesive layer bonds the flexible display and the touch panel at the planar portion, and the flexible display and the touch panel are not bonded together at the curved portion.

In the second aspect, the cover includes a planar portion and a curved portion configured to be deformed. The substrate is located behind the flexible display at a position corresponding to the planar portion. The adhesive layer bonds the flexible display and the touch panel at the planar portion. The flexible display and the touch panel are not bonded together at the curved portion.

According to the second aspect, a load on the flexible display resulting from a deformation of the curved portion is relieved by a movement of the flexible display since the flexible display is not bonded to the touch panel which is integral with the cover at the curved portion. Accordingly, the flexible display can be unlikely to be damaged when the curved portion of the cover is deformed.

A third aspect depends on the second aspect, and the cover presents a rectangular shape, the planar portion is located at a particular portion of the cover, the curved portion is located in a neighborhood of each of a pair of sides of the cover, and an end portion of the flexible display corresponding to the curved portion is bent inwardly.

In the third aspect, the planar portion is located at the particular portion (central portion) of the rectangular cover, the curved portion is located in the neighborhood of a pair of sides of the cover, and an end portion of the flexible display corresponding to the curved portion is bent inwardly.

According to the third aspect, by bending the end portion of the flexible display inwardly, the flexible display, if moved, is unlikely to collide with and damage another component. By bending the end portion of the flexible display inwardly, the flexible display can be moved in a safe direction.

A fourth aspect depends on the first aspect, and the cover is curved as a whole, the substrate is located behind the flexible display at a position corresponding to a particular portion of the cover, the adhesive layer bonds the flexible display and the touch panel at the particular portion, the flexible display and the touch panel are not bonded together in a neighborhood of an edge of the cover, and an end portion of the flexible display corresponding to the neighborhood of the edge of the cover is bent inwardly.

In the fourth aspect, the mobile terminal is a wearable terminal which can be worn on the arm, for example, and the cabinet (12) to which the cover is attached is generally circular. Therefore, the cover is curved as a whole. The substrate is located behind the flexible display at a position corresponding to the particular portion (central portion) of the cover. The adhesive layer bonds the flexible display and the touch panel at the particular portion of the cover. The flexible display and the touch panel are not bonded together in a neighborhood of the edge of the cover. An end portion of the flexible display corresponding to the neighborhood of the edge of the cover is bent inwardly, similarly to the third aspect.

According to the fourth aspect, the flexible display can be unlikely to be damaged even if the cover has a curved shape as a whole. By bending the end portion of the flexible display inwardly similarly to the third aspect, the flexible display can be moved in a safe direction.

A fifth aspect depends on the first aspect, and the flexible display and the touch panel are not bonded together at a particular portion of the cover, the substrate is located behind the flexible display at a remaining portion of the cover, the adhesive layer bonds the flexible display and the touch panel at the remaining portion of the cover, and the flexible display, the cover and the touch panel can be bent freely at the particular portion.

In the fifth aspect, the mobile terminal represents a small notebook-type shape, for example. The flexible display and the touch panel are not bonded together at the particular portion (central portion) of the cover. The substrate is located behind the flexible display at a remaining portion of the cover. The adhesive layer bonds the flexible display and the touch panel at the remaining portion of the cover. For example, a user can bring the mobile terminal into a tablet state, a notebook state and a folded state, and the flexible display, the cover and the touch panel are bent freely at the particular portion.

According to the fifth aspect, the flexible display can be unlikely to be damaged even if the flexible display is bent freely.

A sixth aspect includes a flexible display, a cover configured to protect the flexible display, a touch panel located between the flexible display and the cover and configured to be deformed similarly to the flexible display, a substrate located behind the flexible display, a first adhesive layer configured to partly bond the cover and the touch panel in correspondence to a position where the substrate is located, and a second adhesive layer configured to partly bond the touch panel and the flexible display in correspondence to the position where the substrate is located.

In the sixth aspect, the touch panel (18) is located between the cover (14) and the flexible display (16) as compared with the first aspect, for example. The substrate (30) is located behind the flexible display, similarly to the first aspect. In this case, the first adhesive layer (40) partly bonds the cover and the touch panel in correspondence to a position where the substrate is located. The second adhesive layer (60) also partly bonds the touch panel and the flexible display in correspondence to the position where the substrate is located.

According to the sixth aspect, the flexible display and the touch panel can be unlikely to be damaged because when the flexible display is deformed in accordance with a deformation of the mobile terminal, the flexible display and the touch panel are moved at the unbonded portion even if a load resulting from the deformation is applied to the flexible display and the touch panel.

The foregoing and other objects, features, aspects and advantages of the present disclosure will become more apparent from the following detailed description of the present disclosure when taken in conjunction with the accompanying drawings.

DETAILED DESCRIPTION

According to one embodiment of the present disclosure, a flexible display can be unlikely to be damaged.

The above-described object, another object, characteristics, and advantages of the present disclosure will become more apparent from the following detailed description of embodiments when taken in conjunction with the accompanying drawings.

(First Embodiment)

Figure 1A:
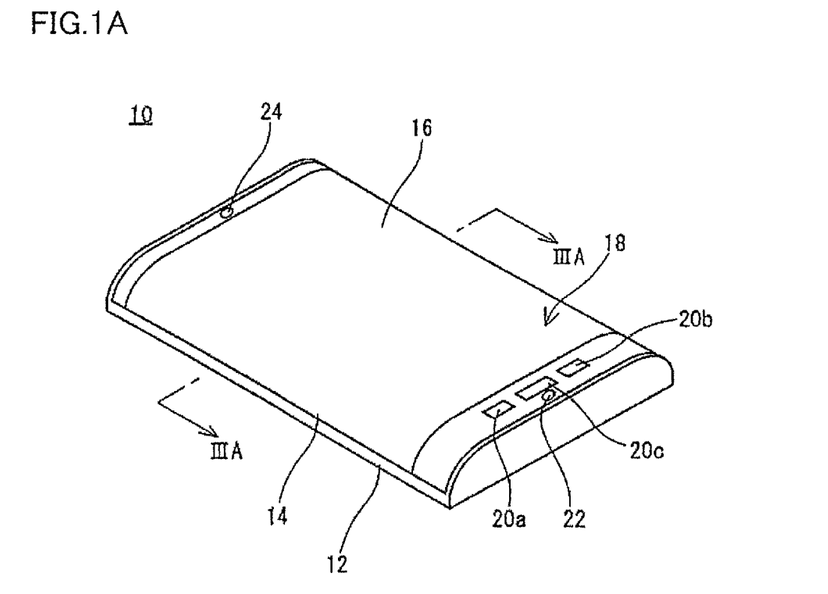
FIG. 1A is an outline view of an example of the appearance of a mobile phone of one embodiment of the present disclosure, showing part of the front surface and a side surface of the mobile phone.

Referring to FIG. 1A, a mobile phone 10 of a first embodiment of the present disclosure is a smartphone as an example, and includes a cabinet 12 and a cover glass 14 so as to present a longitudinal flat rectangular appearance. It is pointed out in advance that the present disclosure can be applied not only to a smartphone but also to any mobile terminal, such as a tablet PC (Personal Computer) and PDA (Personal Digital Assistant).

Cabinet 12 presents a rectangular box-like shape, and includes the bottom surface and a side surface surrounding the periphery. Cabinet 12 is made of resin. Because of its elasticity, cabinet 12 is deformed when a force is applied externally, and when a force is no longer applied thereto, returns to its original state. Cover glass 14 is rectangular, and functions as a cover for box-like shape cabinet 12. For cover glass 14, "Corning Willow Glass (registered trademark)" available from Corning (registered trademark) Inc., is utilized, for example, and can be bent freely.

Figure 1B:
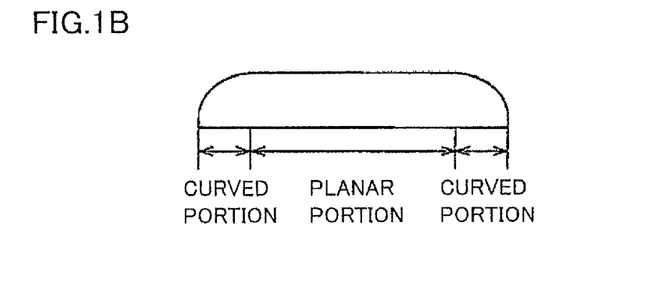
FIG. 1B is an outline view of an example of the appearance of the mobile phone of one embodiment of the present disclosure, showing the lower surface of the mobile phone.

Cabinet 12 and cover glass 14 constitute a housing of mobile phone 10. As understood from the illustration in which mobile phone 10 shown in FIG. 1B is seen from the lower surface, a planar portion is located at a central portion (particular portion) of cover glass 14, and a curved portion is located in the neighborhood of each of a pair of sides of cover glass 14.

Cover glass 14 includes a transparent and colorless display area and the remaining area colored with a predetermined color (e.g., black). A flexible display 16 is located at a position corresponding to the display area. An organic electro-luminescence (OLET: Organic Light Emitting Transistor) display, for example, is employed as flexible display 16, and can be deformed freely because of its flexibility. Flexible display 16 is protected by cover glass 14.

A transparent electrode of ITO (Indium Tin Oxide) or the like is deposited on the display area of cover glass 14, and in this embodiment, this transparent electrode functions as a touch panel 18. Touch panel 18 is integral with cover glass 14.

A call key 20a, a call termination key 20b and a menu key 20c are located on the main surface of mobile phone 10, that is, below the display area of cover glass 14. Touch sensors are used for these keys 20.

Located at the lower side and the upper side of the main surface of mobile phone 10 are a hole 22 for inputting sound to a microphone located in the inside and a hole 24 for outputting sound from a speaker located in the inside, respectively.

For example, when a touch operation and a key operation for making a phone call are performed to start a voice call, received voice is output from the speaker by way of hole 24. User's transmitting voice is input to the microphone by way of hole 22, and transmitted to a phone of a call partner. When an incoming call from another phone is notified, a ring tone is output from the speaker.

Figure 2:
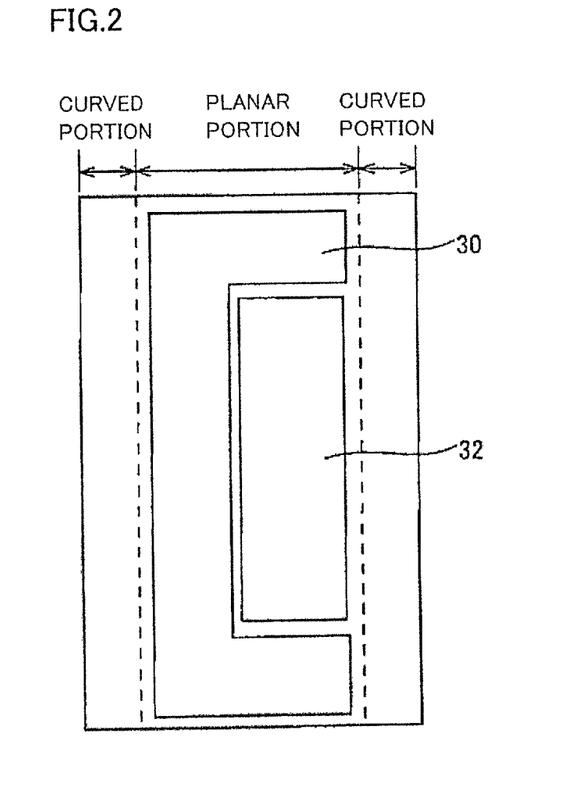
FIG. 2 is an illustration of an example of layout of a substrate and a secondary battery included in the mobile phone shown in FIGS. 1A and 1B.

FIG. 2 is an illustration of an example of layout of a substrate 30 and a secondary battery 32 included in mobile phone 10. Substrate 30 is made of glass epoxy resin, for example, with circuit components, such as a processor and a memory (ROM or RAM), mounted thereon. Secondary battery 32 is also called a lithium ion polymer secondary battery, for example. Both substrate 30 and secondary battery 32 are unlikely to be deformed because of their rigidity. Although other components not shown are located in the inside of mobile phone 10, the other components are not relevant to the essential description of the present disclosure, and illustration and description thereof will not be given.

Substrate 30 and secondary battery 32 are housed within mobile phone 10 in correspondence to a range corresponding to the planar portion of cover glass 14. Substrate 30 presents a U-shape in order to enclose the periphery of secondary battery 32 within mobile phone 10. Therefore, most of the periphery of secondary battery 32 is enclosed by substrate 30. Substrate 30 and secondary battery 32 are located behind flexible display 16 (see FIG. 3A).

Figure 3A:
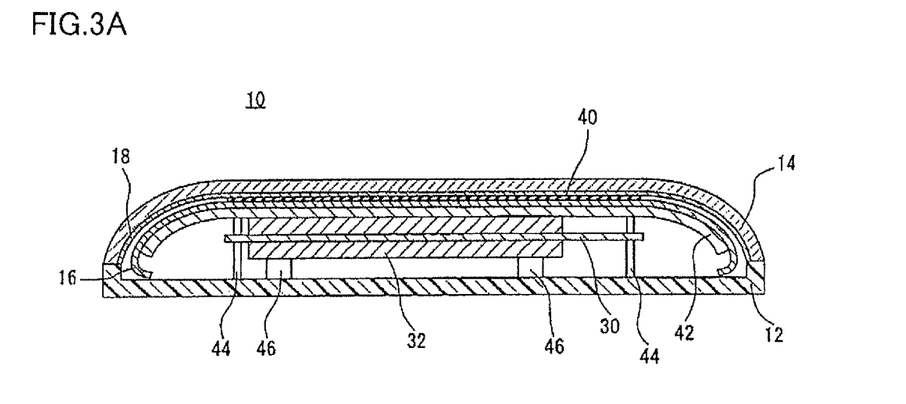
FIG. 3A is an illustration of an example of the cross section of the mobile phone shown in FIGS. 1A and 1B, showing an example of the cross section taken along the line IIIA-IIIA shown in FIG. 1A.

FIG. 3A is an illustration of an example of the cross section taken along the line IIIA-IIIA shown in FIG. 1A. Referring to FIG. 3A, as described above, cover glass 14 is attached to cabinet 12, and a space is left between cabinet 12 and cover glass 14. Touch panel 18 (transparent electrode) is located on the back surface of cover glass 14 in correspondence to the display area of cover glass 14. In another embodiment, touch panel 18 may be located on the entire back surface of cover glass 14.

In the planar portion of cover glass 14 with which touch panel 18 is integral, flexible display 16 is bonded to touch panel 18 with an adhesive layer 40. Adhesive layer 40 is not located on the neighborhood of a pair of right and left sides, namely, on the curved portion, of rectangular cover glass 14. At the curved portion of cover glass 14, flexible display 16 is not bonded to touch panel 18. Therefore, touch panel 18 and flexible display 16 are brought into a state where they are partly bonded together in correspondence to a position where substrate 30 is located. Although a light curable resin adhesive which is cured by irradiation of ultraviolet rays or the like is used for adhesive layer 40, an OCA (Optical Clear Adhesive) tape or the like may be used in another embodiment.

An inner chassis 42 made of resin and having elasticity and a small friction coefficient is located behind flexible display 16. The shape of inner chassis 42 is generally identical to that of cover glass 14. Accordingly, flexible display 16 is unlikely to be separated from cover glass 14 (touch panel 18) at a portion where flexible display 16 is not bonded to touch panel 18 (the curved portion). Inner chassis 42 is fixed in the inside of mobile phone 10 by a plurality of columns 44 located on the bottom surface of cabinet 12. An end portion of flexible display 16 corresponding to the curved portion is not supported by inner chassis 42, but is bent inwardly so as to be partway in contact with the bottom surface of cabinet 12.

Substrate 30 is also fixed by plurality of columns 44. Specifically, an intermediate portion of each column 44 includes a projection, and substrate 30 includes holes for columns 44 to pass through. The holes in substrate 30 are configured such that the projections located at the intermediate portions of columns 44 are caught in these holes when columns 44 pass through these holes. Substrate 30 is also fixed in the inside of mobile phone 10 by plurality of columns 44.

A plurality of spacers 46 located under secondary battery 32 are made of elastic sponge-like resin, for example, and each present a rectangular parallelepiped shape, for example. Secondary battery 32 interposed between plurality of spacers 46 and inner chassis 42 is fixed in the inside of mobile phone 10.

Cabinet 12, cover glass 14 and inner chassis 42 are deformed when a force is applied externally, and when a force is no longer applied externally, they return to the original shape. Therefore, mobile phone 10 has elasticity.

Figure 3B:
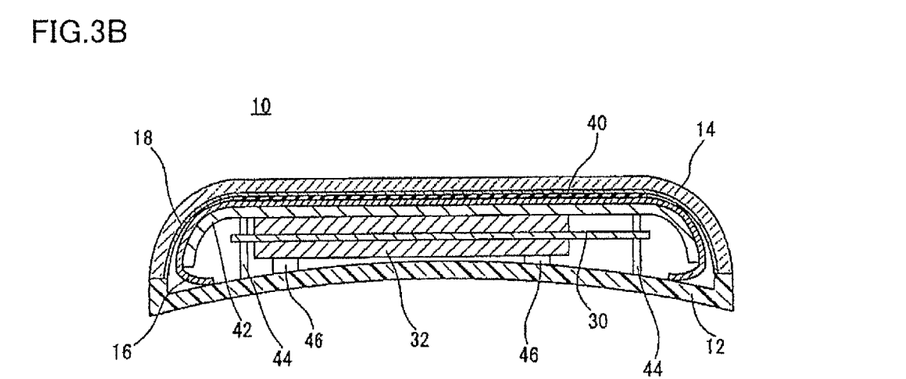
FIG. 3B is an illustration of an example of the cross section of the mobile phone shown in FIGS. 1A and 1B, showing an example of a state where the mobile phone is deformed in the cross section shown in FIG. 3A.

Referring to FIG. 3B, when a force is applied from the curved portion of the main surface to the central portion of another surface of mobile phone 10, for example, the end portion of mobile phone 10 corresponding to the curved portion of cover glass 14 is deformed, that is, bent. Since substrate 30 and secondary battery 32 both having high rigidity are included at the central portion of mobile phone 10 corresponding to the planar portion of cover glass 14, cabinet 12 is not deformed as a whole although the bottom surface thereof is deflected. In the inside of mobile phone 10, since spacers 46 are deformed with a deformation of the bottom surface of cabinet 12, built-in secondary battery 32 does not change in shape.

Due to the difference between the inner diameter of cover glass 14 (touch panel 18) and the outer diameter of flexible display 16 at the curved portion as deformed, a shear stress, that is, a tensile stress (load) toward the inner side, acts on flexible display 16. Since flexible display 16 is not bonded to touch panel 18 at the curved portion, flexible display 16 is moved in accordance with the force acting thereon.

In this way, since flexible display 16 is not bonded to touch panel 18 which is integral with cover glass 14 at the curved portion in the first embodiment, a load to flexible display 16 produced by a deformation of the curved portion is relieved by a movement of flexible display 16. Accordingly, flexible display 16 can be unlikely to be damaged when the curved portion of cover glass 14 is deformed.

Since the end of flexible display 16 is bent inwardly, flexible display 16, if moved, is unlikely to collide with and damage cabinet 12 or the like. For example, if flexible display 16 is not bent, the leading end of flexible display 16 may abut on the bottom surface of cabinet 12 and may not be moved when the curved portion is deformed. In this case, flexible display 16 may be damaged without a load to flexible display 16 being relieved. By bending the end portion of flexible display 16 inwardly as in the first embodiment, flexible display 16 can be moved in a safe direction. In another embodiment, the end of flexible display 16 does not need to be bent as long as flexible display 16 can be moved safely.

As described above, by partly bonding flexible display 16 and touch panel 18 which is integral with cover glass 14, flexible display 16 can be unlikely to be damaged because when flexible display 16 is deformed with a deformation of mobile phone 10, a load resulting from the deformation, if applied to flexible display 16, is relieved through the unbonded portion.

Figure 4:
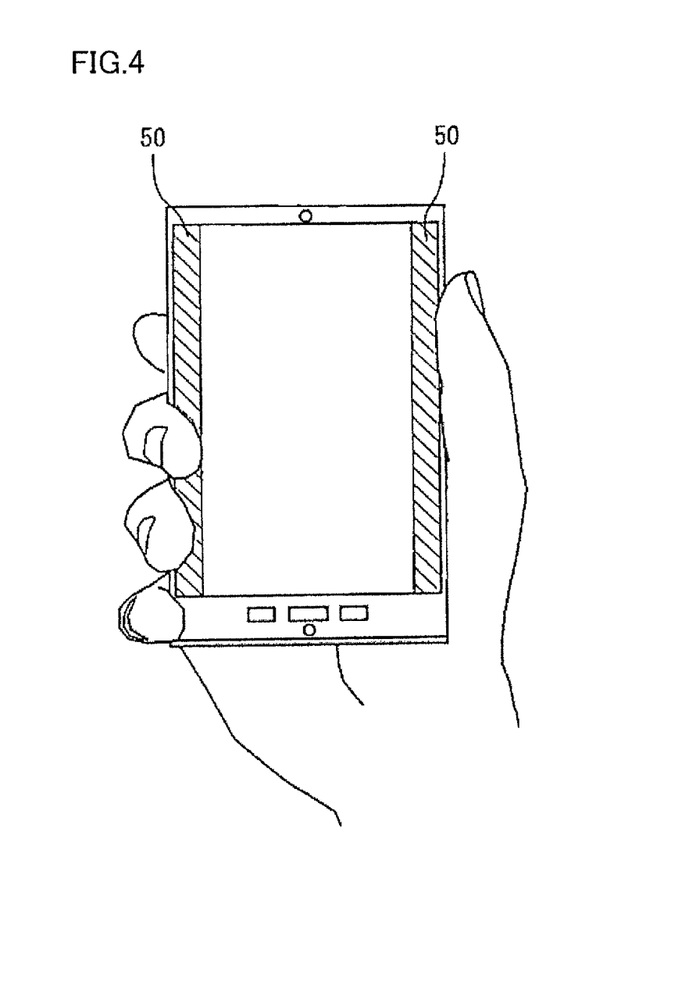
FIG. 4 is an illustration of an example of a state where the mobile phone shown in FIGS. 1A and 1B is held.

Referring to FIG. 4, when mobile phone 10 is large with respect to the hand of a user, for example, it is considered to deform mobile phone 10 into a size that can be easily held by the user gripping mobile phone 10 from the right and left sides and then applying a force thereto. At this time, part of a finger or hand holding mobile phone 10 may be in contact with the display area (touch panel 18) to cause a malfunction. Therefore, in an embodiment, an insensitive area 50 is defined at the right and left ends of touch panel 18. Accordingly, a malfunction can be unlikely to occur when a user deforms mobile phone 10, for example.

Since insensitive area 50 is displayed on flexible display 16, a user can recognize that insensitive area 50 has been set.

In another embodiment, insensitive area 50 may be set when the posture in which mobile phone 10 is held is detected by a gyro sensor or the like, or when the state immediately after mobile phone 10 is moved is detected by an acceleration sensor or the like. In still another embodiment, insensitive area 50 may be set when a multi-touch is detected, or when it is detected that mobile phone 10 has been grasped by a grip sensor or a pressure-sensitive sensor. Insensitive area 50 having been set may be automatically cancelled after a lapse of a predetermined time, or may be cancelled in accordance with the transition to a standby state (locked state).

In an embodiment, a touch operation on insensitive area 50 is disabled by processing of overriding the touch operation. In another embodiment, a touch operation may be disabled by interrupting power supply to the transparent electrode corresponding to insensitive area 50.

In another embodiment, a highly rigid component may be further included at a position corresponding to the planar portion in order to increase rigidity of the planar portion.

(Second Embodiment)

Figure 5:
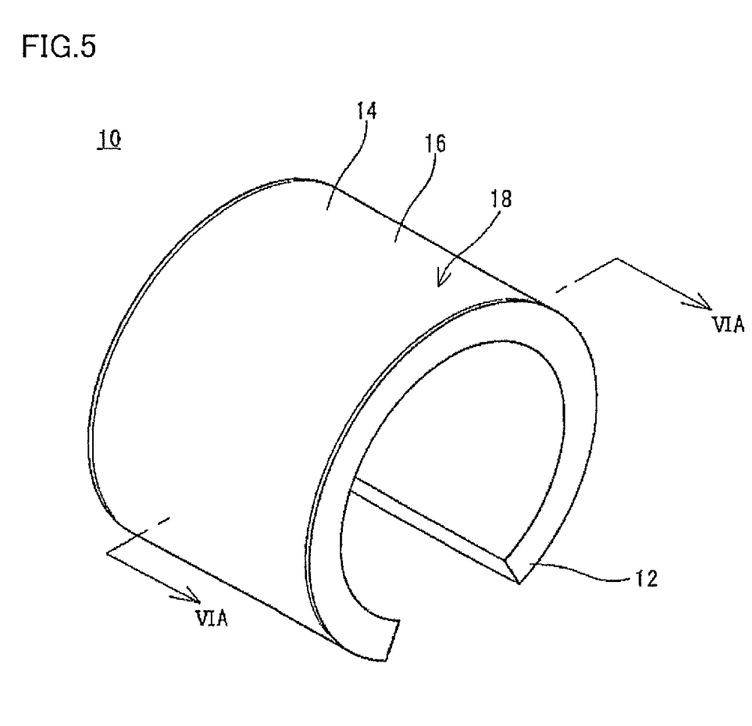
FIG. 5 is an outline view showing an example of the appearance of a mobile phone of a second embodiment.

Referring to FIG. 5, mobile phone 10 of a second embodiment of the present disclosure is a wearable terminal which can be worn on the arm as an example, and cabinet 12 and cover glass 14 constitute the appearance presenting a shape which is wrappable around the arm.

Cabinet 12 presents a rectangular box-like shape, and includes the bottom surface and a side surface surrounding the periphery. Cabinet 12 is generally circular as seen laterally, and part of the periphery is missing. Cover glass 14 is curved as a whole, and has a shape corresponding to cabinet 12. Therefore, cover glass 14 functions as a cover for cabinet 12.

Cabinet 12 and cover glass 14 constitute the housing of mobile phone 10. With cover glass 14 attached to cabinet 12, cover glass 14 serves as approximately the whole outer surface of mobile phone 10.

Cover glass 14 is a transparent and colorless display area except for its end portion, and flexible display 16 is located in correspondence to the display area. The end portion is colored with a predetermined color. Touch panel 18 is integral with the display area of cover glass 14, similarly to the first embodiment.

Since cabinet 12, cover glass 14, flexible display 16, and touch panel 18 are made of the same raw materials and have the same characteristics as those of the first embodiment, mobile phone 10 of the second embodiment is also elastic. For example, a user can attach and detach mobile phone 10 to his/her arm by applying a force so as to expand the disconnected part of the periphery of cabinet 12. Mobile phone 10 returns to its original shape if the user stops applying a force after putting on. Thus, mobile phone 10 in its original shape is not fallen out from the arm.

In the second embodiment, a user can make a phone call with mobile phone 10 by using a headset wirelessly connected to mobile phone 10 by a wireless communication function.

Figure 6A:
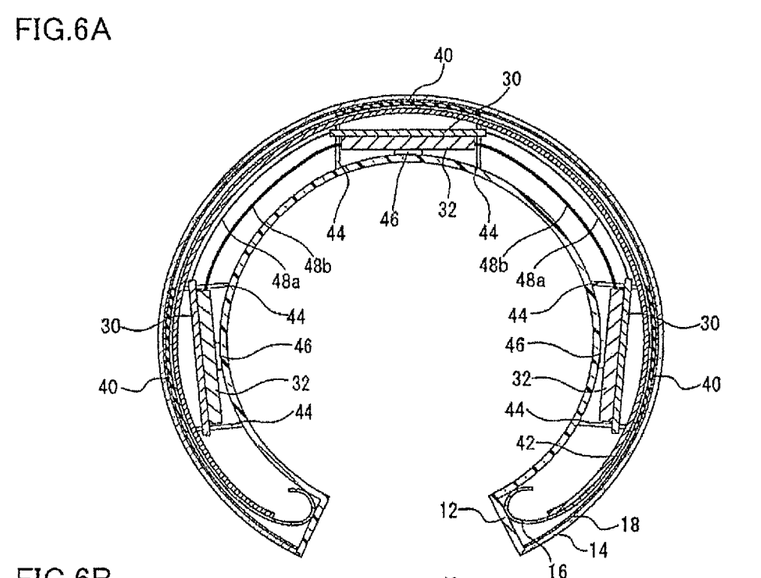
FIG. 6A is an illustration of an example of the cross section of the mobile phone shown in FIG. 5, showing an example of the cross section taken along the line VIA-VIA shown in FIG. 5.

FIG. 6A is an illustration showing an example of the cross section taken along the line VIA-VIA shown in FIG. 5. In this cross sectional view, components identical to those of the first embodiment will not be described in detail.

Referring to FIG. 6A, a space is also left in the inside of mobile phone 10 by means of cabinet 12 and cover glass 14 in the second embodiment. Substrate 30 and secondary battery 32 are each divided into three, and are fixed to the inside of mobile phone 10. Specifically, first substrate 30 and first secondary battery 32 are fixed to a position corresponding to approximately the central portion of cabinet 12. Second and third substrate 30 and second and third secondary battery 32 are spaced at predetermined intervals from first substrate 30 and first secondary battery 32, and fixed to positions not corresponding to the end portion of cabinet 12. Three substrates 30 are connected together with a flexible printed circuit (FPC) 48a, and three secondary batteries 32 are connected together with a flexible printed circuit 48b. Flexible printed circuits 48a and 48b can be bent freely. In the second embodiment, each secondary battery 32 is in the state interposed between substrate 30 and spacers 46, and is fixed in the inside of mobile phone 10.

In the second embodiment, flexible display 16 and touch panel 18 which is integral with cover glass 14 are bonded together with adhesive layer 40 at portions corresponding to substrates 30 and secondary batteries 32, and are not bonded together at the remaining portion. At approximately the central portion of cover glass 14 corresponding to substrate 30 and secondary battery 32, flexible display 16 and touch panel 18 are bonded together with adhesive layer 40, and flexible display 16 and touch panel 18 are not bonded together in the neighborhood of the edge of cover glass 14 not corresponding to substrate 30 and secondary battery 32.

The end portion of flexible display 16 not supported by inner chassis 42 is bent inwardly so as to be partway in contact with the side and bottom surfaces of cabinet 12.

Figure 6B:
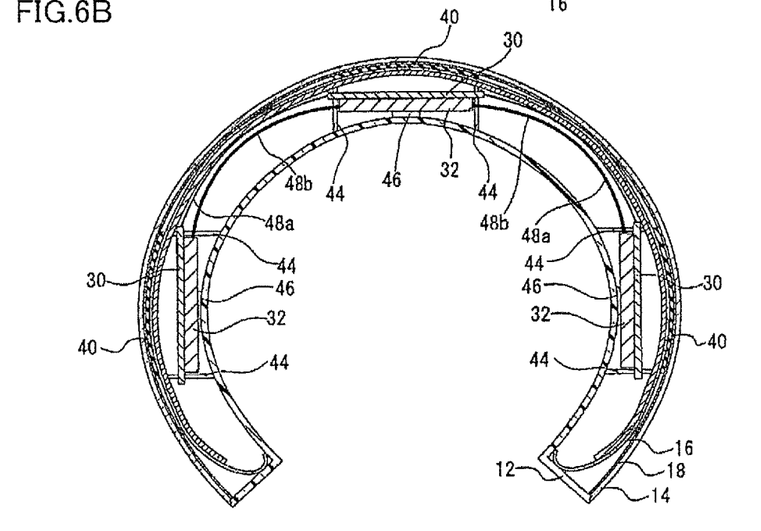
FIG. 6B is an illustration of an example of the cross section of the mobile phone shown in FIG. 5, showing an example of a state where the mobile phone is deformed in the cross section shown in FIG. 6A.

Referring to FIG. 6B, when applying a force so as to expand the disconnected part of the periphery of mobile phone 10 (cabinet 12) in order to put on mobile phone 10 on the arm, for example, the portion where touch panel 18 and flexible display 16 are not bonded together is deformed.

Due to the difference between the inner diameter of deformed cover glass 14 (touch panel 18) and the outer diameter of deformed flexible display 16, a shear stress, that is, a tensile stress (load) toward the outer side, acts on flexible display 16. A section of flexible display 16 not bonded to touch panel 18 is moved in accordance with the force acting thereon. For example, a section of flexible display 16 located between bonded portions is deflected. A section of flexible display 16 adjacent to a bonded portion only on either side is moved. Therefore, a load to flexible display 16 generated by a deformation is relieved by a movement of flexible display 16. Thus, even if mobile phone 10 has a curved shape as a whole, flexible display 16 can be unlikely to be damaged.

Since flexible printed circuit 48a connecting plurality of substrates 30 and flexible printed circuit 48b connecting plurality of secondary batteries 32 are moved similarly to flexible display 16, flexible printed circuits 48a and 48b are also unlikely to be damaged. In this way, in the second embodiment, by locating flexible printed circuits 48a and 48b at the portions to be bent and extended, bending and extension of mobile phone 10 is unlikely to be inhibited.

In the second embodiment, flexible display 16 is configured to be moved in a safe direction by bending the end portions of flexible display 16 inwardly, similarly to the first embodiment.

Although not shown, when a force is applied so as to narrow the portion where the periphery of mobile phone 10 (cabinet 12) is partly disconnected, the end portions of cabinet 12, that is, the portions where flexible display 16 and touch panel 18 are not bonded together, are mainly deformed. At this time, at the portions where flexible display 16 and touch panel 18 are not bonded together, a load on flexible display 16 is also relieved by a movement of flexible display 16.

In another embodiment, substrate 30 and secondary battery 32 may each be divided into four or more. Also in this case, touch panel 18 and flexible display 16 are bonded together in correspondence to each of divided substrates 30 and secondary batteries 32.

(Third Embodiment)

Figure 7A:
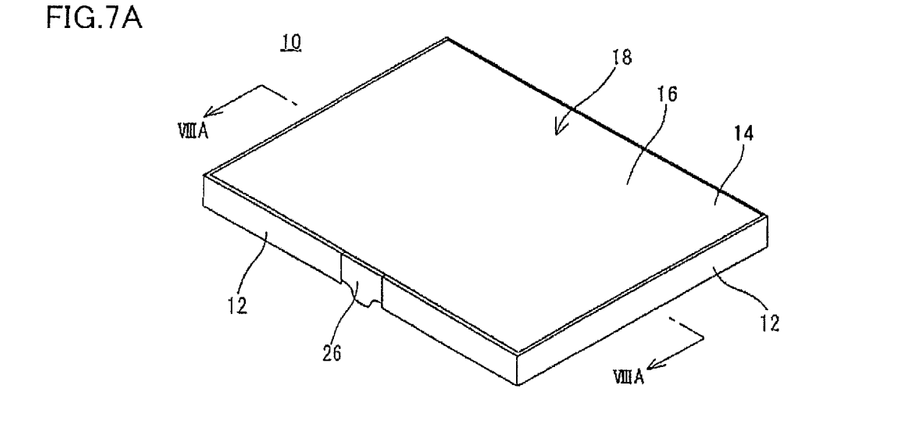
FIG. 7A is an outline view of an example of the appearance of a mobile phone of a third embodiment, showing an example of the appearance in a tablet state.
Figure 7B:
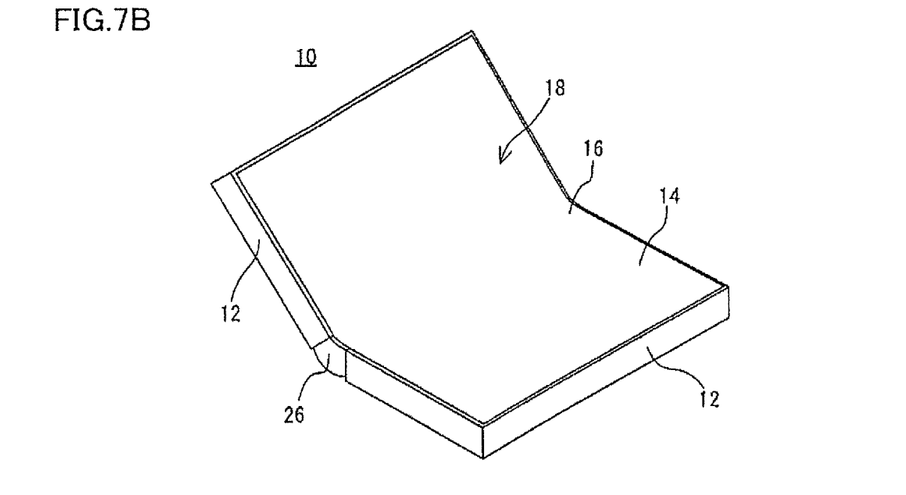
FIG. 7B is an outline view of an example of the appearance of the mobile phone of the third embodiment, showing an example of the appearance in a notebook state.
Figure 7C:
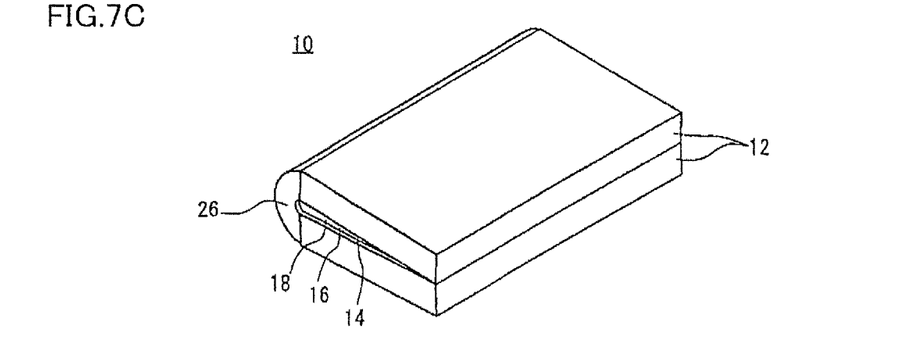
FIG. 7C is an outline view of an example of the appearance of the mobile phone of the third embodiment, showing an example of the appearance in a folded state.

Referring to FIGS. 7A to 7C, mobile phone 10 of a third embodiment of the present disclosure presents a small notebook shape as an example, and cabinet 12 and cover glass 14 constitute the appearance of mobile phone 10. In the third embodiment, the state shown in FIG. 7A is called a tablet state, the state shown in FIG. 7B is called a notebook state, and the state shown in FIG. 7C is called a folded state.

Cabinet 12 presents a rectangular box-like shape, and includes the bottom surface and a side surface surrounding the periphery. Cabinet 12 is divided into two at the central portion (particular portion), and two cabinets 12 are connected together with a rubber cover 26. Cover glass 14 is rectangular, and is attached to constitute the main surface of cabinet 12. Cover glass 14 functions as a cover for cabinet 12. The shape of cover glass 14 is deformed in correspondence to a state change of mobile phone 10. Because of having elasticity, rubber cover 26 is deformed in correspondence to a state change of mobile phone 10.

Cover glass 14 is a transparent and colorless display area approximately as a whole, and flexible display 16 is located in correspondence to the display area. Approximately the whole outer surface of mobile phone 10 corresponds to the display surface of flexible display 16. Touch panel 18 is integral with cover glass 14, similarly to the first embodiment.

Cover glass 14, flexible display 16 and touch panel 18 are made of the same raw materials and have the same characteristics as those of the first embodiment. A state keeping mechanism for keeping each state of mobile phone 10 is located in the inside of mobile phone 10, for example.

In the third embodiment, a user can make a phone call with mobile phone 10 by using a headset wirelessly connected to mobile phone 10 by a wireless communication function, similarly to the second embodiment.

Figure 8A:
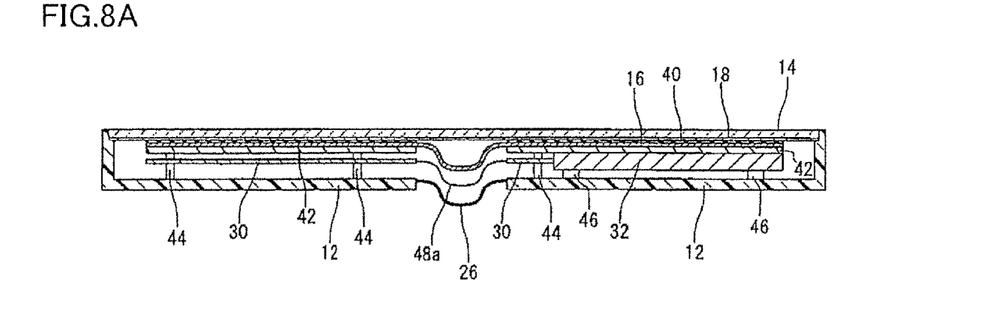
FIG. 8A is an illustration of an example of the cross section of the mobile phone shown in FIGS. 7A to 7C, showing an example of the cross section taken along the line VIIIA-VIIIA shown in FIG. 7A.
Figure 8B:
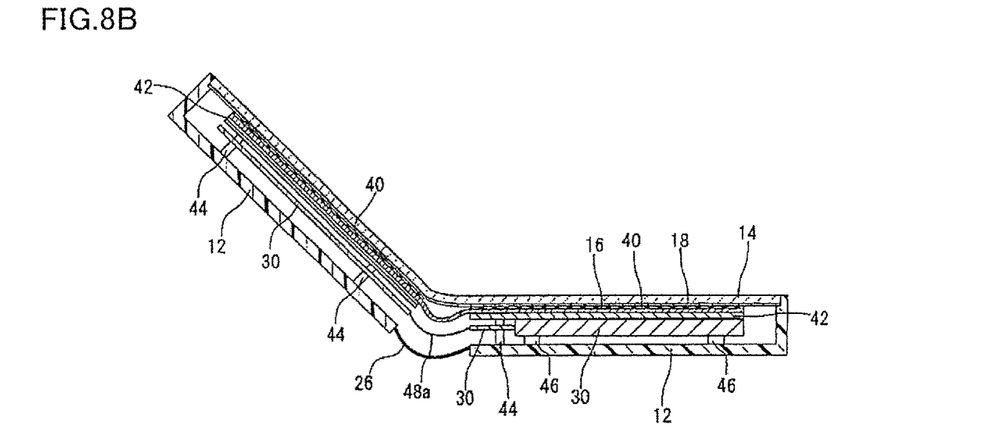
FIG. 8B is an illustration of an example of the cross section of the mobile phone shown in FIGS. 7A to 7C, showing an example of the cross section of the mobile phone in the state shown in FIG. 7B.

FIG. 8A is an illustration showing an example of the cross section taken along the line VIIIA-VIIIA shown in FIG. 7A. FIG. 8B corresponds to a cross section of the notebook state shown in FIG. 7B, and FIG. 8C corresponds to a cross section of the folded state shown in FIG. 7C. In these cross sectional views, components identical to those of the first and second embodiments will not be described in detail.

Referring to FIG. 8A, in the third embodiment, a space is left in the inside of mobile phone 10 by means of cabinet 12, cover glass 14 and rubber cover 26. Substrate 30 is divided into two and fixed to the inside of mobile phone 10. Specifically, two substrates 30 are fixed to two cabinets 12, respectively. Two substrates 30 are connected together with flexible printed circuit 48a similarly to the second embodiment. Similarly to these substrates 30, inner chassis 42 is also divided into two and fixed to each cabinet 12.

Touch panel 18 and flexible display 16 are not bonded together at approximately the central portion, but the remaining portions are bonded together. At approximately the central portion of cover glass 14, touch panel 18 and flexible display 16 are not bonded together, but touch panel 18 and flexible display 16 are bonded together with adhesive layer 40 at the remaining portion of cover glass 14. The unbonded portion of flexible display 16 in the tablet state is in a deflected state. It can also be said that substrate 30 is located behind the flexible display at the remaining portion of cover glass 14.

Secondary battery 32 is included in one cabinet 12, and is fixed by spacers 46 and inner chassis 42, similarly to the first embodiment. In another embodiment, secondary battery 32 may be divided and located at a position corresponding to each of divided substrates 30 similarly to the second embodiment.

Figure 8C:
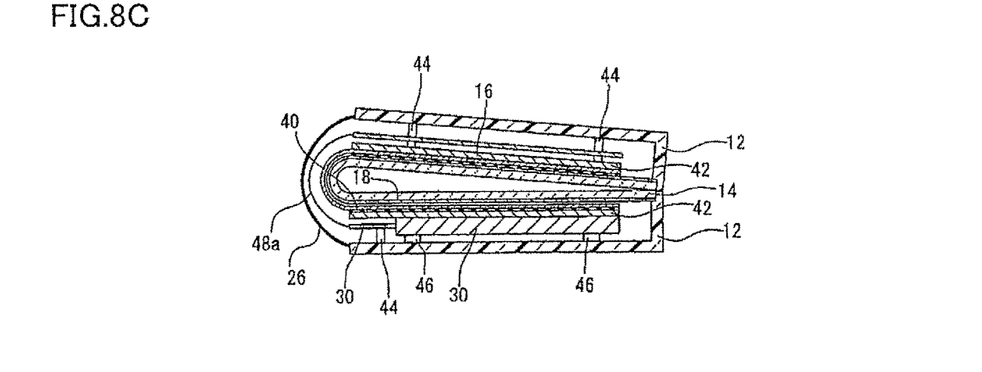
FIG. 8C is an illustration of an example of the cross section of the mobile phone shown in FIGS. 7A to 7C, showing an example of the cross section of the mobile phone in the state shown in FIG. 7C.

Referring to FIG. 8B, when mobile phone 10 is brought into the notebook state, cover glass 14 is deformed, and flexible display 16 is also deformed accordingly. Due to the difference between the inner diameter of cover glass 14 (touch panel 18) and the outer diameter of flexible display 16, a load on flexible display 16 is relieved as the deflected portion of flexible display 16 is extended. Referring to FIG. 8C, when mobile phone 10 is brought into the folded state, the difference between the inner diameter of cover glass 14 and the outer diameter of flexible display 16 is increased further, and the load on flexible display 16 is also increased. This load is also absorbed by extension of the deflected portion of flexible display 16. In this way, even if flexible display 16 is in a state that can be bent freely, flexible display 16 can be unlikely to be damaged.

In another embodiment, a load on flexible display 16 may be relieved by not bonding an area from the central portion to one end portion of flexible display 16. In this case, since flexible display 16 does not need to be deflected even in the tablet state, display of flexible display 16 is more visible.

The first embodiment may be combined with the second and third embodiments. This combination will not be described in detail, as details thereof is readily conceivable.

Figure 9:
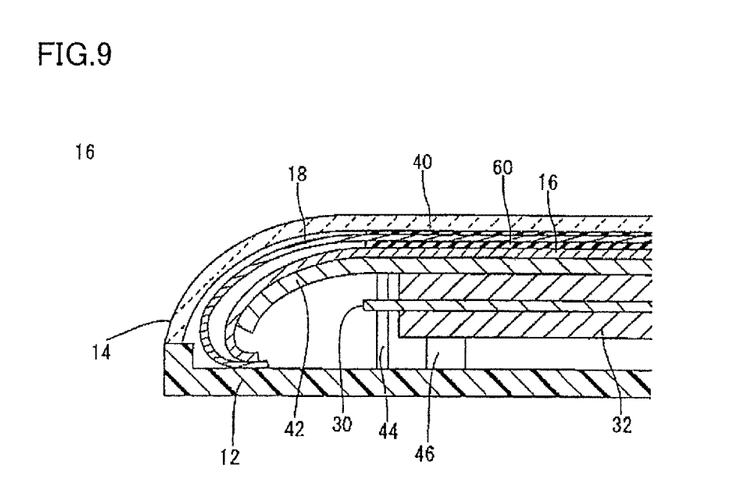
FIG. 9 is an illustration showing another example of the cross section of the mobile phone shown in FIGS. 1A and 1B.

In another embodiment, independently-formed touch panel 18 may be located between cover glass 14 and flexible display 16. Referring to FIG. 9, in another embodiment, cover glass 14 and touch panel 18 are partly bonded together at a position corresponding to substrate 30. Touch panel 18 and flexible display 16 are also partly bonded together with a second adhesive layer 60 at a position corresponding to substrate 30.

For example, when touch panel 18 is located between cover glass 14 and flexible display 16 in the first embodiment, cover glass 14 and touch panel 18 are bonded together, and touch panel 18 and flexible display 16 are bonded together, at the planar portion. At the curved portion, cover glass 14 and touch panel 18 are not bonded together, and touch panel 18 and flexible display 16 are not bonded together. Accordingly, flexible display 16 and touch panel 18 can be unlikely to be damaged because when flexible display 16 is deformed with a deformation of mobile phone 10, flexible display 16 and touch panel 18 are moved at the unbonded portion even if a load resulting from the deformation is applied to flexible display 16 and touch panel 18.

In another embodiment, flexible display 16 and touch panel 18 are also configured to be moved in a safe direction by bending the end portions of flexible display 16 and touch panel 18 inwardly.

In another embodiment, in order to make dust or the like unlikely to enter a portion where flexible display 16 and touch panel 18 are not bonded together, a gel resin layer may be located at that portion. Alternatively, inner chassis 42 or the like may be deformed to bring flexible display 16 into a blocked state, so that dust does not enter from the outside.

In another embodiment, as long as mobile phone 10 can have elasticity, cabinet 12 and inner chassis 42 may be made of another raw material (e.g., metal), Instead of cover glass 14, a resin cover having elasticity may be used. A display other than an organic electroluminescence display may be employed as flexible display 16.

In another embodiment, touch panel 18 does not need to be integral with cover glass 14. In this case, part of flexible display 16 will be directly bonded to cover glass 14.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A mobile terminal comprising:
a flexible display;
a cover configured to protect the flexible display;
a touch panel disposed under the cover, and wherein the flexible display is disposed under the touch panel;
a substrate located under the flexible display;
an adhesive layer configured to partly bond the flexible display and the touch panel in correspondence to a position where the substrate is located; and
a cabinet coupled to the cover so as to provide an inner space for containing the flexible display, touch panel and substrate, wherein the substrate is coupled to the cabinet by at least one column extending from an inner surface of the cabinet in a direction toward the cover, and wherein the substrate includes at least one hole through which the at least one column passes from the inner surface of the cabinet toward the cover.

2. The mobile terminal according to claim 1, wherein
the cover includes a planar portion and a curved portion configured to be deformed,
the substrate is located behind the flexible display at a position corresponding to the planar portion,
the adhesive layer bonds the flexible display and the touch panel at the planar portion, and
the flexible display and the touch panel are not bonded together at the curved portion.

3. The mobile terminal according to claim 2, wherein
the cover presents a rectangular shape,
the planar portion is located at a particular portion of the cover,
the curved portion is located in a neighborhood of each of a pair of sides of the cover, and
an end portion of the flexible display corresponding to the curved portion is bent inwardly.

4. The mobile terminal according to claim 1, wherein
the cover is curved as a whole,
the substrate is located behind the flexible display at a position corresponding to a particular portion of the cover,
the adhesive layer bonds the flexible display and the touch panel at the particular portion,
the flexible display and the touch panel are not bonded together in a neighborhood of an edge of the cover, and
an end portion of the flexible display corresponding to the neighborhood of the edge of the cover is bent inwardly.

5. The mobile terminal according to claim 1, wherein
the flexible display and the touch panel are not bonded together at a particular portion of the cover,
the substrate is located behind the flexible display at a remaining portion of the cover,
the adhesive layer bonds the flexible display and the touch panel at the remaining portion of the cover, and
the flexible display, the cover and the touch panel are configured to be bent freely at the particular portion.

* * * * *